United States Patent
Akoum et al.

(10) Patent No.: US 11,456,791 B2
(45) Date of Patent: *Sep. 27, 2022

(54) GENERIC FEEDBACK TO ENABLE RECIPROCITY AND OVER THE AIR CALIBRATION FOR ADVANCED NETWORKS

(71) Applicant: AT&T Intellectual Property I, L.P., Atlanta, GA (US)

(72) Inventors: Salam Akoum, Austin, TX (US); Xiaoyi Wang, Austin, TX (US); Arunabha Ghosh, Austin, TX (US); Aditya Chopra, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/939,799

(22) Filed: Jul. 27, 2020

(65) Prior Publication Data

US 2020/0358506 A1 Nov. 12, 2020

Related U.S. Application Data

(63) Continuation of application No. 16/059,788, filed on Aug. 9, 2018, now Pat. No. 10,763,935.

(51) Int. Cl.
*H04B 7/06* (2006.01)
*H04B 7/0456* (2017.01)
*H04B 17/24* (2015.01)
*H04B 17/11* (2015.01)

(52) U.S. Cl.
CPC ......... *H04B 7/0626* (2013.01); *H04B 7/0469* (2013.01); *H04B 17/11* (2015.01); *H04B 17/24* (2015.01)

(58) Field of Classification Search
None
See application file for complete search history.

(56) References Cited

U.S. PATENT DOCUMENTS

| | | | |
|---|---|---|---|
| 7,366,245 B2 | 4/2008 | Li et al. | |
| 7,747,250 B2 | 6/2010 | Larsson et al. | |
| 7,920,533 B2 | 4/2011 | Koo et al. | |
| 8,983,397 B2 | 3/2015 | Gorokhov | |
| 9,900,073 B2 | 2/2018 | Zhang | |
| 2005/0265436 A1 | 12/2005 | Suh et al. | |
| 2012/0069887 A1 | 3/2012 | Park et al. | |

(Continued)

OTHER PUBLICATIONS

Non-Final Office Action received for U.S. Appl. No. 16/059,788 dated Oct. 29, 2019, 38 pages.

*Primary Examiner* — Saumit Shah
(74) *Attorney, Agent, or Firm* — Amin, Turocy & Watson, LLP

(57) ABSTRACT

Facilitating generic feedback to enable reciprocity and over the air calibration for advanced networks (e.g., 4G, 5G, and beyond) is provided herein. Operations of a system can comprise selecting information to include in a channel state information feedback report based on a feedback instance. The operations can also comprise generating the channel state information feedback report as a function of channel statistics of channels. Further, the operations can comprise transmitting the channel state information feedback report to a network device of a communications network.

20 Claims, 10 Drawing Sheets

(56) References Cited

U.S. PATENT DOCUMENTS

| | | | |
|---|---|---|---|
| 2013/0109448 A1* | 5/2013 | Garrett | H04B 7/0695 |
| | | | 455/575.7 |
| 2013/0195214 A1 | 8/2013 | Zhang et al. | |
| 2014/0098689 A1 | 4/2014 | Lee et al. | |
| 2014/0269502 A1 | 9/2014 | Forenza et al. | |
| 2016/0365913 A1 | 12/2016 | Lau et al. | |
| 2017/0366325 A1 | 12/2017 | Kwak et al. | |
| 2018/0097667 A1 | 4/2018 | Yoo et al. | |
| 2018/0102887 A1 | 4/2018 | Chen et al. | |
| 2019/0074883 A1 | 3/2019 | Park et al. | |
| 2021/0203388 A1* | 7/2021 | Tomeba | H04W 24/10 |

\* cited by examiner

GENERIC FEEDBACK TO ENABLE RECIPROCITY AND OVER THE AIR CALIBRATION FOR ADVANCED NETWORKS

RELATED APPLICATION

The subject patent application is a continuation of, and claims priority to, U.S. patent application Ser. No. 16/059,788 (now U.S. Pat. No. 10,763,935), filed Aug. 9, 2018, and entitled "GENERIC FEEDBACK TO ENABLE RECIPROCITY AND OVER THE AIR CALIBRATION FOR ADVANCED NETWORKS," the entirety of which application is hereby expressly incorporated by reference herein.

TECHNICAL FIELD

This disclosure relates generally to the field of mobile communication and, more specifically, to channel state information frameworks in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
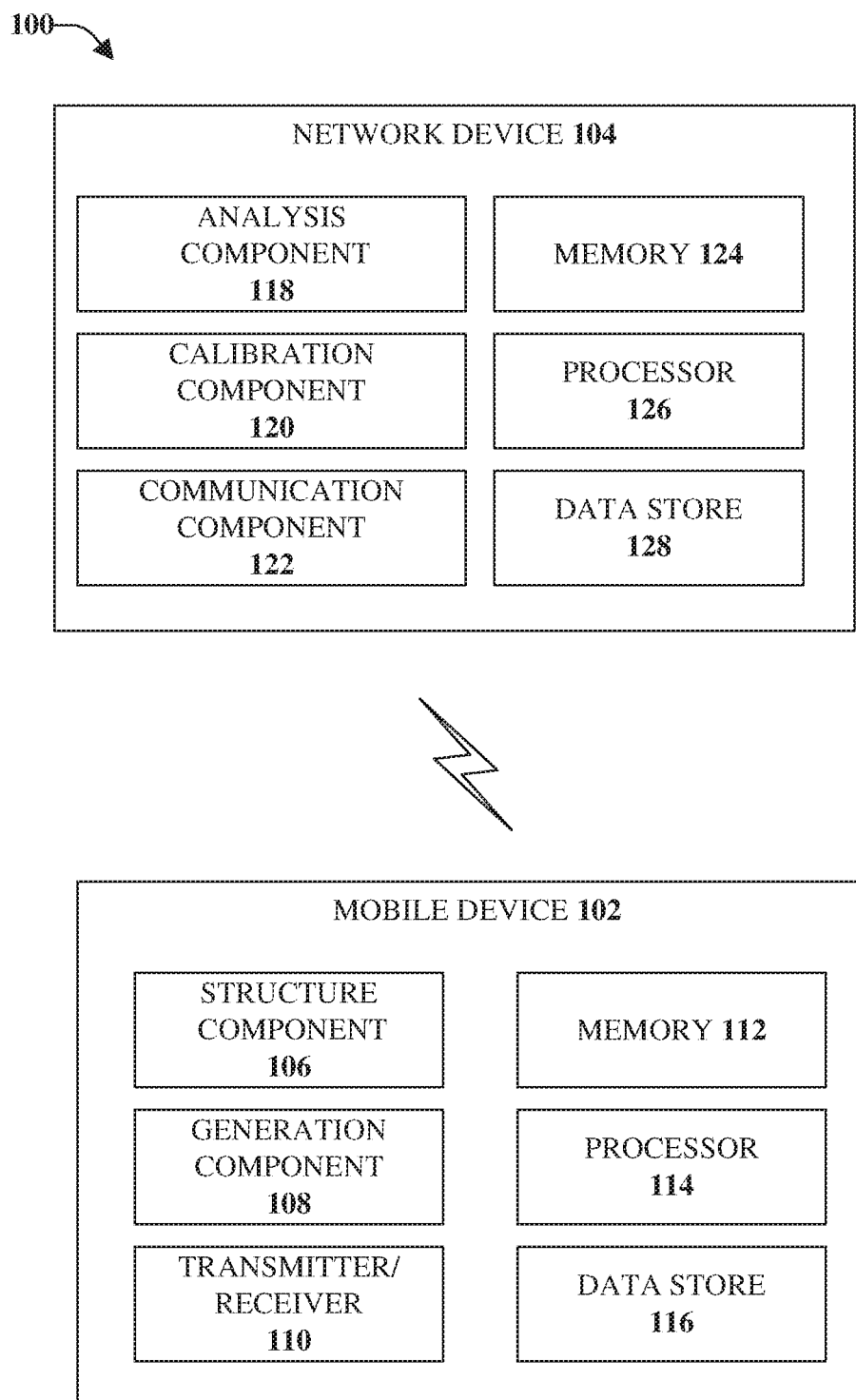
FIG. 1 illustrated is an example, non-limiting, communications system for facilitating reciprocity and over the air calibration in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate generic feedback to enable reciprocity and over the air calibration. In one embodiment, described herein is a system that can comprise a processor and a memory that stores executable instructions that, when executed by the processor, facilitate performance of operations. The operations can comprise selecting information to include in a channel state information feedback report based on a feedback instance. The operations can also comprise generating the channel state information feedback report as a function of channel statistics of channels. Further, the operations can comprise transmitting the channel state information feedback report to a network device of a communications network.

In an example, the operations can further comprise defining a feedback container between the network device and a mobile device. The feedback container can carry channel state information. Further to this example, the channel state information carried by the feedback container can be configured to be utilized by the network device for over-the-air calibration. In an alternate or additional example, the feedback container can comprise a channel covariance matrix combined with channel state information feedback information.

In another example, the channel state information feedback report can exclude preconfigured channel state information report content. According to some implementation, the channel state information feedback report can be an on-demand compressed channel state information feedback report. In some implementations, the operations can also comprise, prior to selecting the information, receiving a request from the network device for the channel state information feedback report.

In accordance with some implementations, the operations can comprise decomposing the channels into a product of domain components comprising an azimuth domain, a vertical domain, and an uncorrelated domain. Further to these implementations, the azimuth domain can be configured to track an azimuth direction, the vertical domain can be configured to track a vertical direction, and the uncorrelated domain can be configured to track non-uniformity in an antenna array structure and a cross-polarization. In some implementations, the operations can also comprise separately characterizing the azimuth domain, the vertical domain, and the uncorrelated domain based on respective channel state information feedback processes.

Another embodiment described herein is a method comprising selecting, by a mobile device comprising a processor, channel state information for inclusion in a feedback report based on a request for the feedback report. The request can be received from a network device of a communications network. The channel state information can be selected based on conditions at the mobile device at a time when the request was received. The method can also comprise generating, by the mobile device, the feedback report with selected channel state information and facilitating, by the mobile device, transmitting the feedback report to the network device in response to the request.

According to an example, selecting the channel state information can comprise defining a feedback container that carries the channel state information. Further, the method can comprise conveying a definition of the feedback container to the network device.

In another example, the method can comprise combining, by the mobile device, a channel covariance matrix and the channel state information as combined information and including, by the mobile device, the combined information in a feedback container. The combined information can be utilized to mitigate an amount of overhead as compared with utilizing separate channels to convey the channel covariance matrix and the channel state information.

According to a further example, the method can comprise decomposing, by the mobile device, a channel into an azimuth domain, a vertical domain, and an uncorrelated domain. The azimuth domain can be configured to track an azimuth direction, the vertical domain can be configured to track a vertical direction, and the uncorrelated domain can be configured to track non-uniformity in an antenna array structure and a cross-polarization. Further to the above example, the method can comprise separately characterizing, by the mobile device, the azimuth domain, the vertical domain, and the uncorrelated domain based on respective channel state information feedback processes.

Another embodiment provided herein relates to a machine-readable storage medium, comprising executable instructions that, when executed by a processor, facilitate performance of operations. The operations can comprise, based on a request for a report received from a network device of a communications network, selecting a format for the report comprising channel state information. The operations can also comprise defining a feedback container to send to the network device. The feedback container can carry channel state information. Further, the operations can comprise generating the report based on channel statistics currently available and the feedback container and sending the report to the network device in response to the request.

According to an example, the method can comprise decomposing a channel into domain components comprising an azimuth domain, a vertical domain, and an uncorrelated domain. The azimuth domain can be configured to track an azimuth direction, the vertical domain can be configured to track a vertical direction, and the uncorrelated domain can be configured to track non-uniformity in an antenna array structure and a cross-polarization.

In accordance with some implementations, the operations can comprise decomposing a channel into domain components comprising an azimuth domain, a vertical domain, and an uncorrelated domain. Further, the operations can comprise separately characterizing the azimuth domain, the vertical domain, and the uncorrelated domain based on respective channel state information feedback processes.

According to some implementations, the operations can comprise combining a channel covariance matrix and the channel state information as combined information. Further, the operations can comprise including the combined information in the feedback container. The combined information can be utilized to mitigate an amount of overhead as compared with utilizing separate channels to convey the channel covariance matrix and the channel state information.

To meet the huge demand for data centric applications, 3GPP is currently discussing to extend the current 4G standards to 5G also called New Radio (NR) access. Massive Multiple Input, Multiple Output (MIMO) is a technology that enables NR to have better spectrum efficiency over an LTE system. To fully utilize the MIMO potentials, a large number of antenna ports (e.g., up to around thirty-two ports) have been defined. Based on information theory, with the large number of antenna ports, a large CSI feedback overhead is needed. An effective way to reduce feedback overhead is to utilize reciprocity in the radio channel. Reciprocity procedures have been extensively studied in Time Division Duplexing (TDD) systems. Reciprocity calibration has been widely adopted in TDD systems where a calibration signal will transmit some signal to estimate phase offset between transmission and receiving. In frequency division duplexing (FDD) systems, where the downlink and uplink use different frequency bands, the duplexer blocks the reception on the self-transmission, making it difficult to apply TDD calibration methodology in FDD systems.

The various aspects provided herein relate to generic feedback to enable reciprocity and over the air calibration. MIMO is a core technology to meet the thousand-fold improvements in spectral efficiency envisioned for next generation cellular networks. In Long Term Evolution (LTE) Frequency Division (FD) MIMO and 5G New Radio (NR), the number of antenna ports is significantly larger than previous generation cellular networks. Accurate channel state information (CSI) is critical for the operation of massive MIMO systems. In TDD systems, CSI can be obtained by invoking channel reciprocity. For FDD systems, obtaining CSI through limited feedback from the receiver to the transmitter over the air is costly because of the dimensions of the involved channels in massive MIMO systems. This subsequently affects the scalability of the reference signal design and hinders the practicality of massive MIMO. The dimensionality problem is clear in the design of the feedback procedure in the first generation of NR.

Another challenge of massive MIMO is that, even if channel reciprocity can be achieved, the Radio Frequency (RF) circuitry in the radio units are usually not identical and cause the baseband-to-baseband channel to be non-reciprocal. These discrepancies should be calibrated to be able to rely on the Uplink-Downlink (UL-DL) reciprocity. Calibration where dedicated hardware circuitry is required to calibrate all antenna chains is not feasible, especially in massive MIMO systems. Over the air calibration, based on two-way communication between the nodes, where the calibration is carried out at the base station side with over the air measurements is thus preferred, when the number of antennas grows large.

Obtaining an accurate representation of the channel at the transmitter in massive MIMO systems is thus crucial in reciprocity-based procedures (e.g., TDD and/or FDD) to properly characterize the channel, as well as to properly calibrate the circuitry for an accurate characterization of the baseband-to-baseband channel between the base station and the User Equipment (UE). Benefiting from compression techniques such that over the air calibration overhead and CSI feedback are combined, or the CSI feedback is selectively compressed depending on the nature of the channel reduces the feedback overhead requirements.

Referring initially to FIG. 1, illustrated is an example, non-limiting, communications system 100 for facilitating reciprocity and over the air calibration in accordance with one or more embodiments described herein.

The conventional CSI feedback framework is based on feedback from the UE or mobile device. For example, type 2 CSI feedback is based on a linear combination with subband phase and amplitude adjustment for each selected beam. The feedback overhead can easily reach over 100 bits per report. That imposes a huge challenge on the uplink feedback channel design.

Further, CSI Resource Indicator (CRI) based feedback allows the UE to select one out of several precoded CSI-RS resource each representing a beam but how the base-station obtains the precoder for those CSI-RS resources is unknown. So, effectively, in FDD systems, there is currently no other choice than to have a large number of feedback bits to obtain the fine granular CSI at gNB side (e.g., at a network device).

Furthermore, with the advent of massive MIMO systems, traditional over the air calibration methods are challenged because the mobile device feeds back a large amount of DL CSI for all the base station antennas to perform calibration.

To overcome these as well as other challenges, the various aspects provided herein can facilitate generation and communication of an on-demand compressed channel state information (CSI) feedback report. The disclosed aspects provide a generic reciprocity-based CSI acquisition and over-the-air calibration framework applicable to reciprocity-based systems. Further, provided herein is a generic feedback container that can decrease or mitigate the feedback overhead and provide flexibility over the type of feedback needed at the transmitter (e.g., a network device).

The communications system 100 can comprise a mobile device 102 and a network device 104. The network device 104 can be included in a group of network devices of a wireless network. Although only a single communication device and a single network device are shown and described, the various aspects are not limited to this implementation. Instead, multiple communication devices and/or multiple network devices can be included in a communications system.

The mobile device 102 can include a structure component 106, a generation component 108, a transmitter/receiver 110, at least one memory 112, at least one processor 114, and at least one data store 116. The network device 104 can include an analysis component 118, a calibration component 120, a communications component 122, at least one memory 124, at least one processor 126, and at least one data store 128.

The structure component 106 can be configured to determine information that should be included in a CSI feedback report (or simply CSI report). For example, information that can be included in the CSI feedback report can include, but are not limited to, one or more CSI Resource Indicators (CRIs), one or more Rank Indicators (RIs), one or more Precoding Matrix Indicators (PMI), one or more LIs, and/or one or more Channel Quality Indicators (CQIs).

The structure component 106 can determine the information to include based on the channel statistics. Thus, the structure component 106 can select what to include in the CSI feedback report at a given feedback instance. Further the structure component 106 can autonomously make the determination as to which information to include (and which information to exclude) without a preconfigured CSI report content. According to some implementations, the CSI feedback report can be an on-demand compressed CSI feedback report.

Based on the information that should be included, as defined by the structure component 106, the generation component 108 can create the CSI feedback report as a function of channel statistics of one or more channels. For example, the generation component 108 or another component of the mobile device 102 can measure one or more parameters of the one or more channels. The measurement can be of all the parameters or only the group of parameters selected by the structure component 106.

Upon or after creation of the CSI feedback report, the transmitter/receiver 110 can be configured to transmit the CSI feedback report to the network device 104. For example, the CSI feedback report can be created based on a request received from the network device 104 (e.g., via the transmitter/receiver 110). Such an on-demand selective feedback procedure can solve the large overhead and testability issues that can be caused by explicit feedback from the receiver (e.g., the mobile device 102) to the transmitter (e.g., the network device 104).

The CSI feedback report can be received at the network device 104 via the communications component 122. The analysis component 118 can evaluate the information received in the CSI feedback report and based on the analysis, the calibration component 120 can perform over-the-air calibration of the mobile device 102.

The transmitter/receiver 110 (and/or the communications component 122) can be configured to transmit to, and/or receive data from, the network device 104 (or the mobile device 102), other network devices, and/or other communication devices. Through the transmitter/receiver 110 (and/or the communications component 122), the mobile device 102 (and/or the network device 104) can concurrently transmit and receive data, can transmit and receive data at different times, or combinations thereof. According to some implementations, the transmitter/receiver 110 (and/or the communications component 122) can facilitate communications between an identified entity associated with the mobile device 102 (e.g., an owner of the mobile device 102, a user of the mobile device 102, and so on). Further, the transmitter/receiver 110 (and/or the communications component 122) can be configured to receive, from the network device 104 or other network devices, multimedia content as discussed herein.

The at least one memory 112 can be operatively connected to the at least one processor 114. Further, the at least one memory 124 can be operatively connected to the at least one processor 126. The memories (e.g., the at least one memory 112, the at least one memory 124) can store executable instructions that, when executed by the processors (e.g., the at least one processor 114, the at least one processor 126) can facilitate performance of operations. Further, the processors can be utilized to execute computer executable components stored in the memories.

For example, the memories can store protocols associated with facilitating generic feedback to enable reciprocity and over the air calibration as discussed herein. Further, the memories can facilitate action to control communication between the mobile device 102 and the network device 104 such that the communications system 100 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 2:
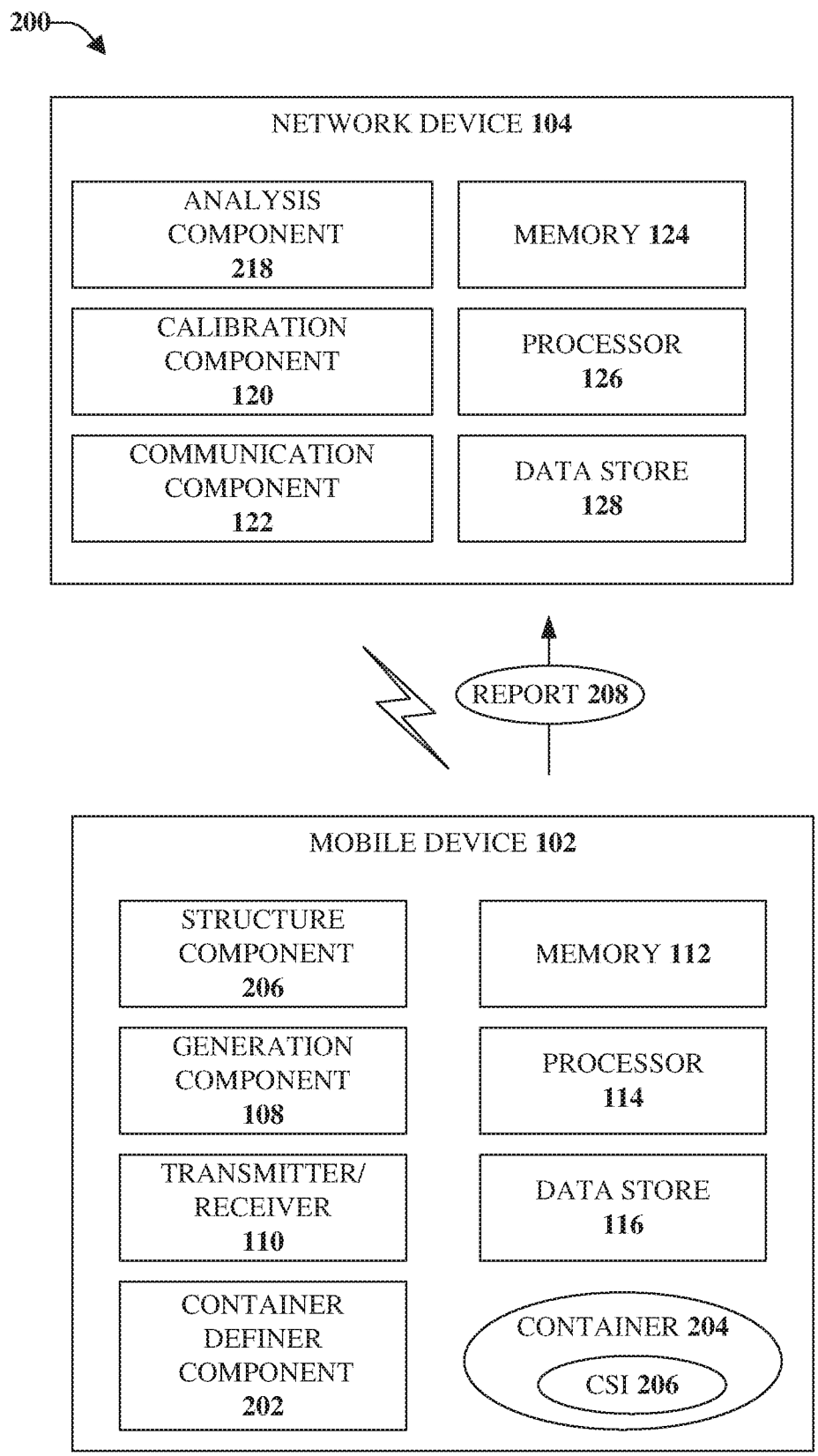
FIG. 2 illustrates an example, non-limiting, communications system for communicating containers to facilitate reciprocity and over the air calibration in accordance with one or more embodiments described herein.

FIG. 2 illustrates an example, non-limiting, communications system 200 for communicating containers to facilitate reciprocity and over the air calibration in accordance with one or more embodiments described herein. Repetitive description of like elements employed in other embodiments described herein is omitted for sake of brevity. The communications system 200 can comprise one or more of the components and/or functionality of the communications system 100, and vice versa.

The conventional CSI feedback framework is very much based on feedback from the mobile device. For example, type 2 CSI feedback is based on a linear combination with subband phase and amplitude adjustment for each selected beam. The feedback overhead can easily reach over 100 bits per report. That imposes a huge challenge on the uplink feedback channel design. CRI based feedback allows the mobile device to select one out of several precoded CSI-RS resource each representing a beam but how the base-station obtains the precoder for those CSI-RS resources is unknown. So, effectively, in FDD systems, there is currently no other choice than to have a large number of feedback bits to obtain the fine granular CSI at the network device side. Furthermore, with the advent of massive MIMO systems, traditional over the air calibration methods are challenged because the mobile device needs to feed back a large amount of DL CSI for all the base station antennas to perform calibration.

Discussed herein is a feedback framework, which is a general framework that works for FDD and TDD reciprocity, and incorporates over-the-air calibration, which is crucial for both types of reciprocity to work. Allowing the mobile device to control what goes in the feedback container is a powerful tool to get the necessary feedback without overwhelming the system with unnecessary overhead. This solution allows for lower overhead and better testability of the reciprocity procedures, as well as over-the-air calibration, especially for FDD reciprocity-based systems. Over-the-air calibration following this feedback container does not have to reside in one coherence time and can be sent on demand without incurring additional feedback overhead for different groups of antennas. This framework does not have to be restricted to Single User MIMO (SU-MIMO), but also include a distributed feedback solution across multiple mobile devices.

As discussed, the CSI feedback report is constructed at the mobile device 102 depending on the channel statistics, such that the mobile device 102 can select what to include in the CSI report at a given feedback instance (e.g., via the structure component 106), without a preconfigured CSI report content.

As illustrated, a container definer component 202 can be configured to create or define at least one feedback container 204 between the network device 104 and the mobile device 102. The at least one feedback container 204 can be configured to carry the CSI 206. For example, the CSI 206 carried by the at least one feedback container 204 can be configured to be utilized by the network device 104 for over-the-air calibration (e.g., via the calibration component 120). Thus, the at least one feedback container 204 can carry the channel information that is used by the network device 104 for over-the-air calibration.

The contents of the at least one feedback container 204 can change depending on the contents of the feedback report (illustrated as report 208). Further, different content options can be Radio Resource Control (RRC) configurable and/or based on a standardized handshake between a vendor of the network device 104 and a vendor of the mobile device 102.

Such an on-demand selective feedback procedure can solve the large overhead and testability issues that can be caused by explicit feedback from the receiver (e.g., the mobile device 102) to the transmitter (e.g., the network device 104). According to some implementations, the feedback content inside of the at least one feedback container 204 does not need to be tested by 3GPP, instead, infra-vendor and chip-set vendor can confirm how the feedback information will be used in the inter-device test case.

Figure 3:
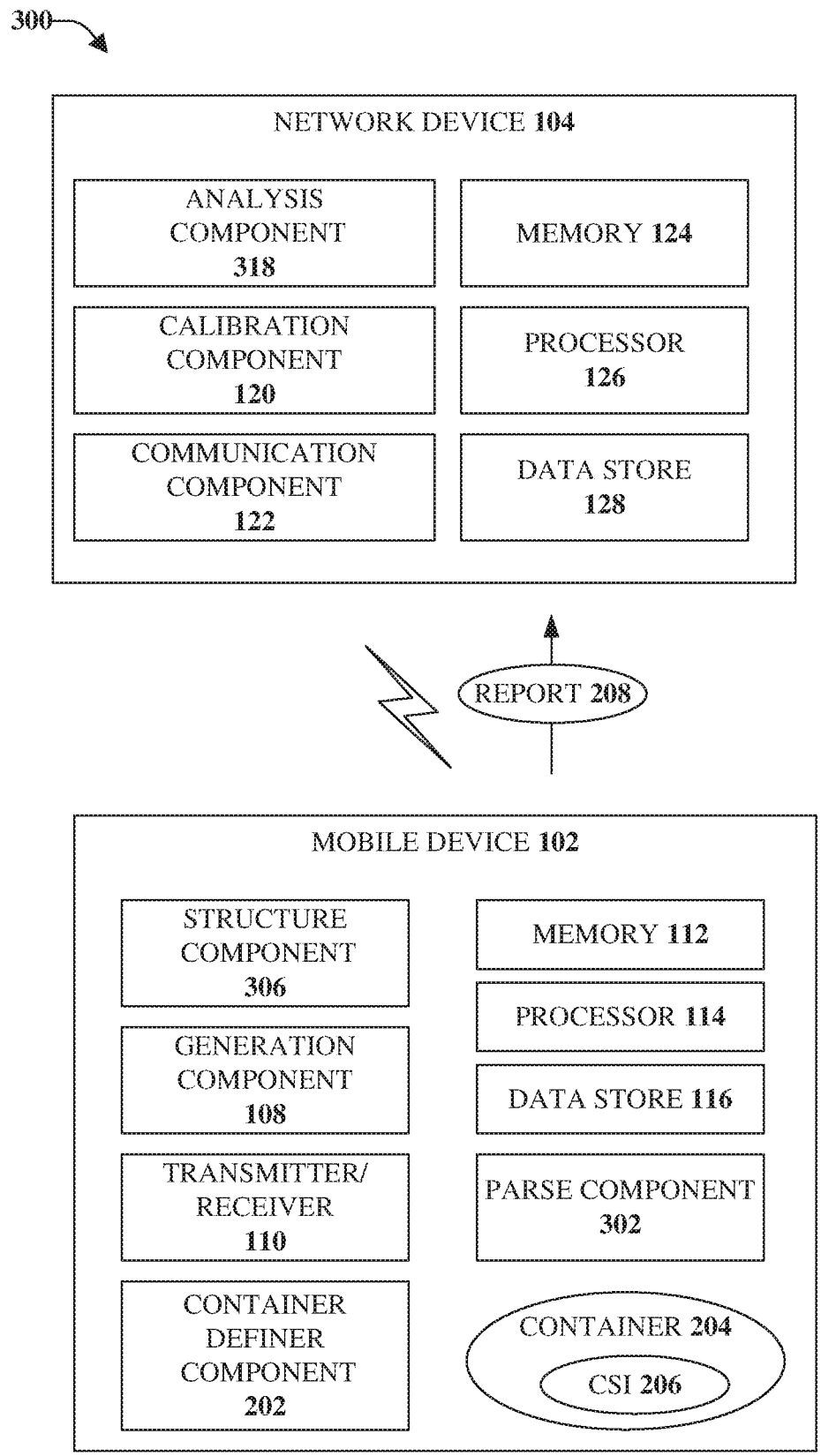
FIG. 3 illustrates an example, non-limiting, communications system for decomposing channels into domain components for a channel state information feedback report in accordance with one or more embodiments described herein.

FIG. 3 illustrates an example, non-limiting, communications system 300 for decomposing channels into domain components for a channel state information feedback report in accordance with one or more embodiments described herein. Repetitive description of like elements employed in other embodiments described herein is omitted for sake of brevity. The communications system 300 can comprise one or more of the components and/or functionality of the communications system 100, the communications system 200, and vice versa.

As mentioned, the report 208 can be an on-demand compressed channel state information (CSI) feedback report. Accordingly, a parse component 302 can be configured to decompose the channel into a product of three domain components, namely, an azimuth (H) domain, a vertical (V) domain, and an uncorrelated (U) domain. The domains can describe antenna patterns. The azimuth domain can refer to "the horizon" or "the horizontal." The vertical domain can refer to "the vertical." For example, the azimuth domain can track the azimuth direction and the vertical domain can track the vertical dimension. Further the uncorrelated domain can track the possible non-uniformity in the antenna array structure and the cross-polarization.

According to some implementations, the component domains (e.g., the azimuth (H) domain, the vertical (V) domain, and the uncorrelated (U) domain) can be separately characterized (e.g., via the parse component 302) by a CSI feedback process that is optimal for the respective domain. The CSI process optimal for the respective domain can be determined in terms of feedback frequency and granularity, type of precoder used and precoding order, for example.

For example, the azimuth (H) domain can be characterized by a first CSI feedback process, the vertical (V) domain can be characterized by a second CSI feedback process, and the uncorrelated (U) domain can be characterized by a third CSI feedback process. The feedback processes can be different feedback processes, or two or more processes can be a same process and/or a similar process.

The three domains (e.g., the azimuth (H) domain, the vertical (V) domain, and the uncorrelated (U) domain) can be determined by the covariance of the channel matrix. Further, the three domains (e.g., the azimuth (H) domain, the vertical (V) domain, and the uncorrelated (U) domain) can relate not only to the antenna structure and its separability but also how it couples with the channel. The mobile device 102 can then selectively feedback to the base station (e.g., via the transmitter/receiver 110), not necessarily all the components, but whatever is needed for the base station to perform over-the-air calibration.

It is noted that other examples of antenna grouping for feedback compression can be utilized with the disclosed aspects, although not specifically discussed herein. For example, one or more antenna groupings for feedback compression can be utilized in order to achieve a close to optimal tradeoff between feedback overhead and feedback reliability, as discussed herein.

According to some implementations, the at least one feedback container 204 can be used to carry the channel feedback required for over-the-air calibration. In traditional over-the-air calibration, the channel or channel covariance matrix is fed back to learn the channel on the uplink, then receive the channel on the downlink. As provided herein, the covariance feedback can be combined with the CSI feedback. Accordingly, the selective feedback at the mobile device 102 can include information important for calibration. At least one advantage of this is that no extra overhead is incurred for calibration, and the calibration is instead embedded in regular CSI feedback framework, leaving it almost invisible to the system (e.g., the communications network).

Figure 4:
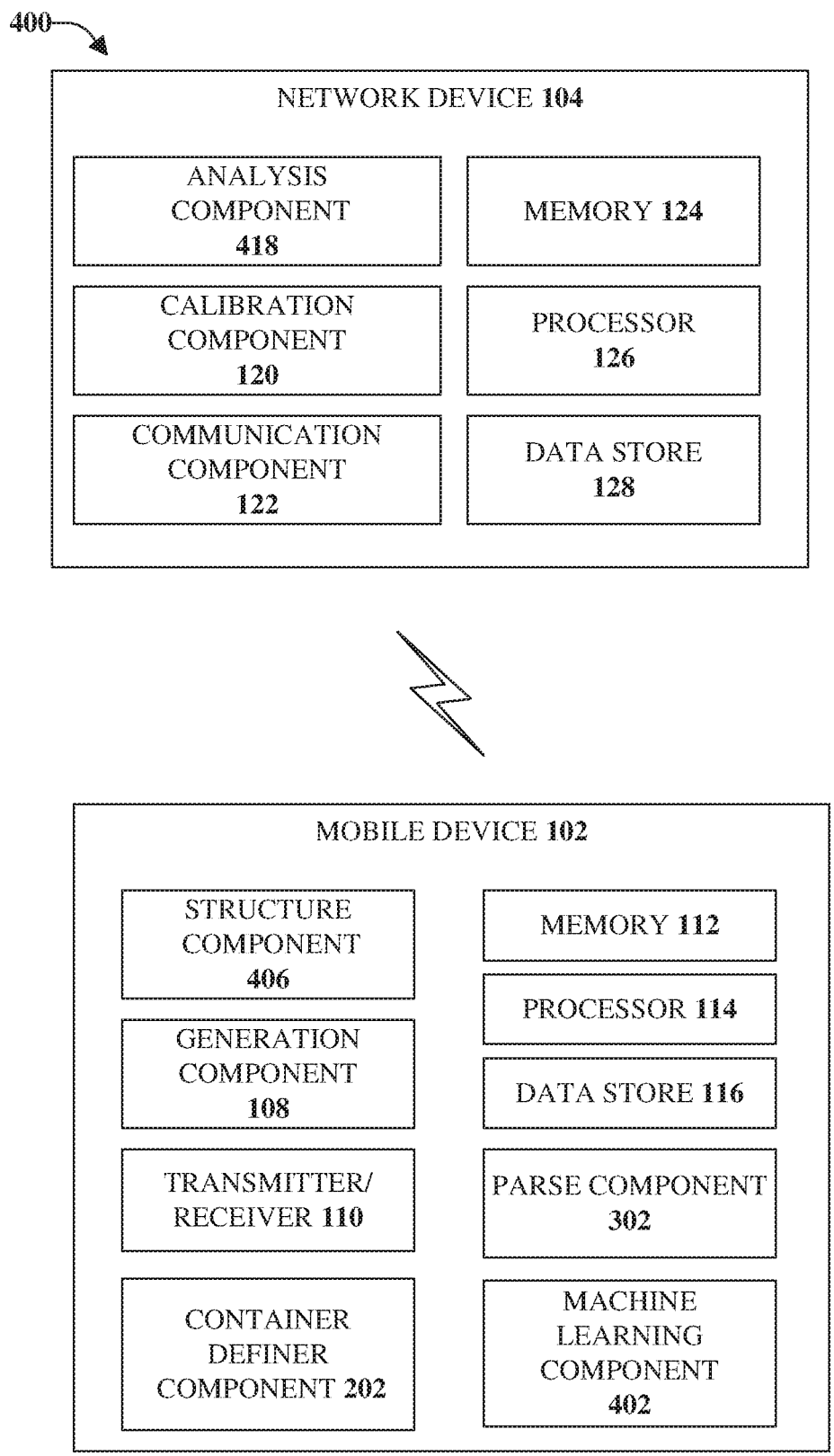
FIG. 4 illustrates an example, non-limiting, communications system that employs automated learning to facilitate one or more of the disclosed aspects in accordance with one or more embodiments described herein.

FIG. 4 illustrates an example, non-limiting, communications system 400 that employs automated learning to facilitate one or more of the disclosed aspects in accordance with one or more embodiments described herein. Repetitive description of like elements employed in other embodiments described herein is omitted for sake of brevity. The communications system 400 can comprise one or more of the components and/or functionality of the communications system 100, the communications system 200, the communications system 300, and vice versa.

As illustrated, the communications system 400 can comprise a machine learning and reasoning component 402 that can be utilized to automate one or more of the disclosed aspects. The machine learning and reasoning component 402 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 402 can employ principles of probabilistic and decision theoretic inference. Additionally, or alternatively, the machine learning and reasoning component 402 can rely on predictive models constructed using machine learning and/or automated learning procedures. Logic-centric inference can also be employed separately or in conjunction with probabilistic methods.

The machine learning and reasoning component 402 can infer which information should be included in the report and/or which information does not need to be included in the report. Such inference can be performed by the machine learning and reasoning component 402 by obtaining knowledge about the channels and knowledge about which information would be useful by the network device 104 to perform over-the-air calibration of the mobile device 102. The inference can be performed at about the same time as a request is received from the network device 104 (e.g., via the transmitter/receiver 110).

Based on this knowledge, the machine learning and reasoning component 402 can make an inference based on which information to include, which information does not need to be included, how to decompose a channel into its separate domains (e.g., the azimuth (H) domain, the vertical (V) domain, and the uncorrelated (U) domain), or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific context or information, or can generate a probability distribution over states, for example. The inference can be probabilistic. For example, computation of a probability distribution over states of interest based on a consideration of data and/or conditions. The inference can also refer to techniques employed for composing higher-level information from a set of conditions and/or data. Such inference can result in the construction of new conditions and/or actions from a set of observed conditions and/or stored conditions data, whether or not the conditions are correlated in close temporal proximity, and whether the conditions and/or data come from one or several conditions and/or data sources. Various classification procedures and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with the selection of feedback parameters to be included in the CSI report, evaluation of a current feedback instance, decomposing the channels into the various domains, and so forth) can employ various artificial intelligence-based procedures for carrying out various aspects thereof.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine what information should be automatically included in a report at a particular moment in time (e.g., at about the same time as a request is received from the network device 104).

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing channel conditions, by receiving extrinsic information about what is needed by the network device 104 to perform over-the-air calibration, and so on). For example, SVM's can be configured through a learning or training phase within a classifier constructor and feature selection module. Thus, a classifier(s) can be used to automatically learn and perform a number of functions, including, but not limited to, determining according to a predetermined criteria when to include information, when to exclude information, when to create a feedback report, and so forth. The criteria can include, but is not limited to, similar requests, historical information, and so forth.

Additionally, or alternatively, an implementation procedure (e.g., a rule, a policy, and so on) can be applied to control and/or regulate information in order to mitigate an amount of unnecessary overhead, and so forth. In some implementations, based upon a predefined criterion, the rules-based implementation can automatically and/or dynamically interpret requests. In response thereto, the rule-based implementation can automatically interpret and carry out functions associated with the request by employing a predefined and/or programmed rule(s) based upon any desired criteria.

Advantages of the disclosed aspects include, but are not limited to, a feedback framework that is a general framework that works for FDD and TDD reciprocity, and incorporates over-the-air calibration, which is crucial for both types of reciprocity to work. Another advantage is allowing the mobile device to control what goes in the feedback container, which is a powerful tool to obtain the necessary feedback without overwhelming the system (e.g., the communication network) with unnecessary overhead. A further advantage of the disclosed aspects is that it allows for lower overhead and better testability of the reciprocity procedures, as well as over-the-air calibration, especially for FDD reciprocity-based systems. A further advantage is that over-the-air calibration following the feedback container does not have to reside in one coherence time and can be sent on demand without incurring additional feedback overhead for different groups of antennas. Yet another advantage is that the framework discussed herein does not have to be restricted to SU-MIMO, but can also include a distributed feedback solution across multiple mobile devices.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
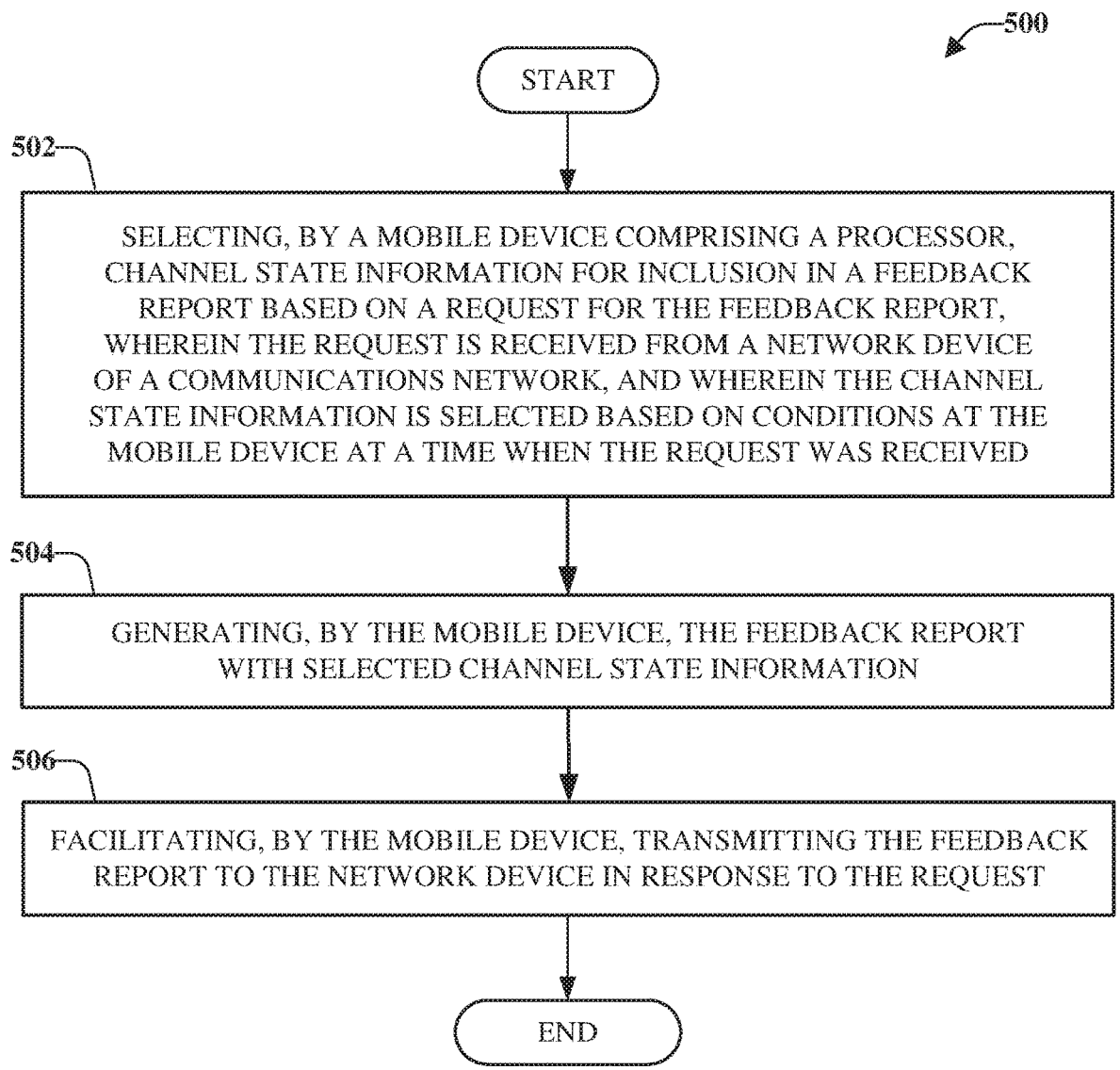
FIG. 5 illustrates an example, non-limiting, method for facilitating generic feedback to enable reciprocity and over-the-air calibration in accordance with one or more embodiments described herein.

FIG. 5 illustrates an example, non-limiting, method 500 for facilitating generic feedback to enable reciprocity and over-the-air calibration in accordance with one or more embodiments described herein. Repetitive description of like elements employed in other embodiments described herein is omitted for sake of brevity. The method 500 can be implemented by a mobile device of a wireless network, the mobile device comprising a processor. Alternatively, or additionally, a machine-readable storage medium can comprise executable instructions that, when executed by a processor, facilitate performance of operations for the method 500.

The method 500 starts, at 502, with selection of CSI for inclusion in a feedback report (e.g., via the structure component 106). The selection of the CSI can be based on a request for the feedback report. For example, the request can be received from a network device of a communications network. The CSI can be selected based on conditions at the mobile device at a time when the request was received, or at a time after the request was received (e.g., during the selection process).

At 504, the feedback report with the selected channels state information can be generated (e.g., via the generation component 108). Further, at 504, the feedback report can be transmitted to the network device in response to the request (e.g., via the transmitter/receiver 110).

Figure 6:
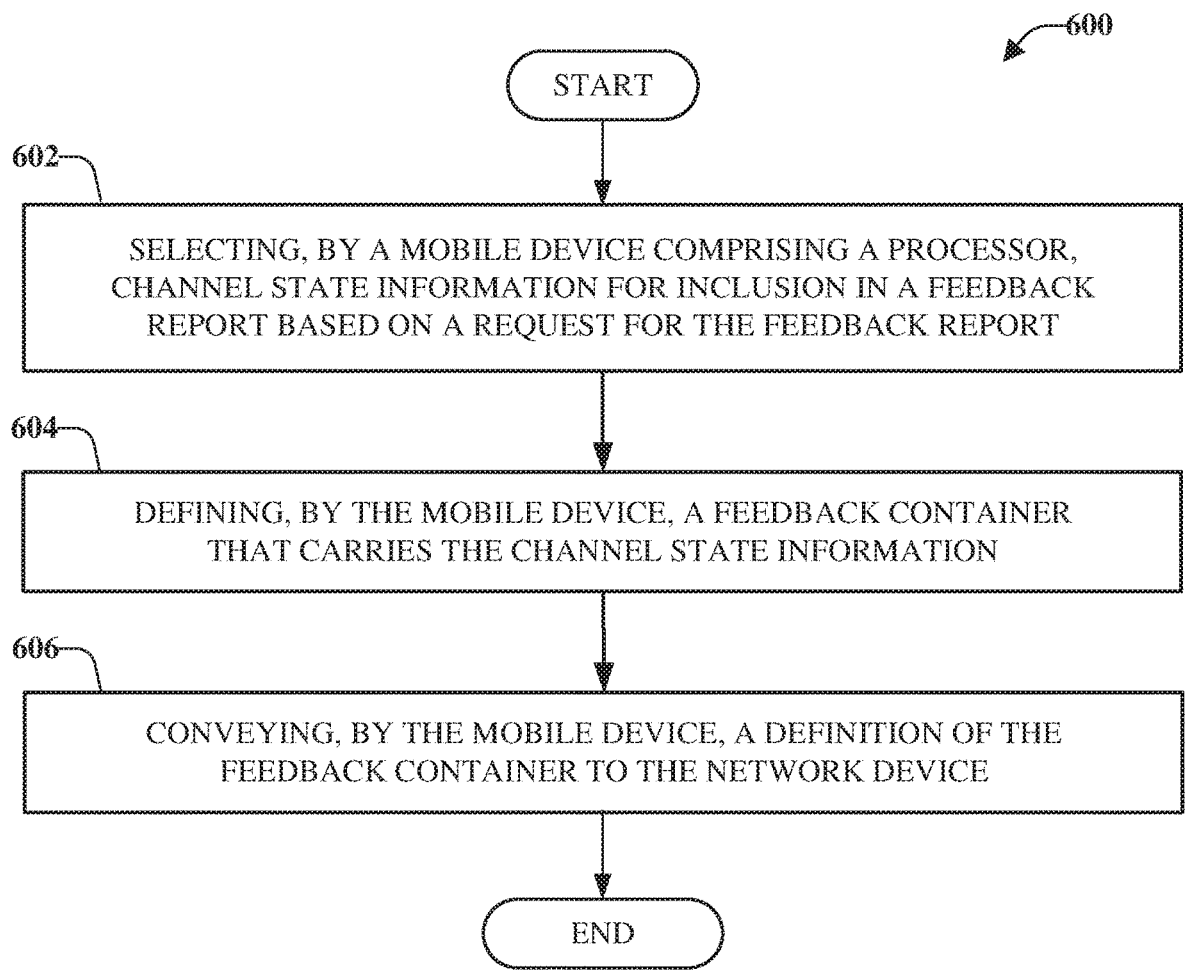
FIG. 6 illustrates an example, non-limiting, method for generating and transmitting a feedback container to facilitate reciprocity and over-the-air calibration in accordance with one or more embodiments described herein.

FIG. 6 illustrates an example, non-limiting, method 600 for generating and transmitting a feedback container to facilitate reciprocity and over-the-air calibration in accordance with one or more embodiments described herein. Repetitive description of like elements employed in other embodiments described herein is omitted for sake of brevity. The method 600 can be implemented by a mobile device of a wireless network, the mobile device comprising a processor. Alternatively, or additionally, a machine-readable storage medium can comprise executable instructions that, when executed by a processor, facilitate performance of operations for the method 600.

At 602, CSI for inclusion in a feedback report can be selected. For example, a request can be received from a network device for the report and, based on the request, a CSI can be selected (e.g., via the structure component 106). Selecting the CSI can include, at 604, defining at least one feedback container that carries the CSI (e.g., via the container definer component 202). The feedback container can carry channel state information (e.g., the CSI 206). Further, the CSI carried by the feedback container can be configured to be utilized by the network device for over-the-air calibration. In some implementations, the feedback container can comprise a channel covariance matrix combined with channel state information feedback information. Further, at 606, a definition of the feedback container can be conveyed to the network device (e.g., via the transmitter/receiver 110).

Figure 7:
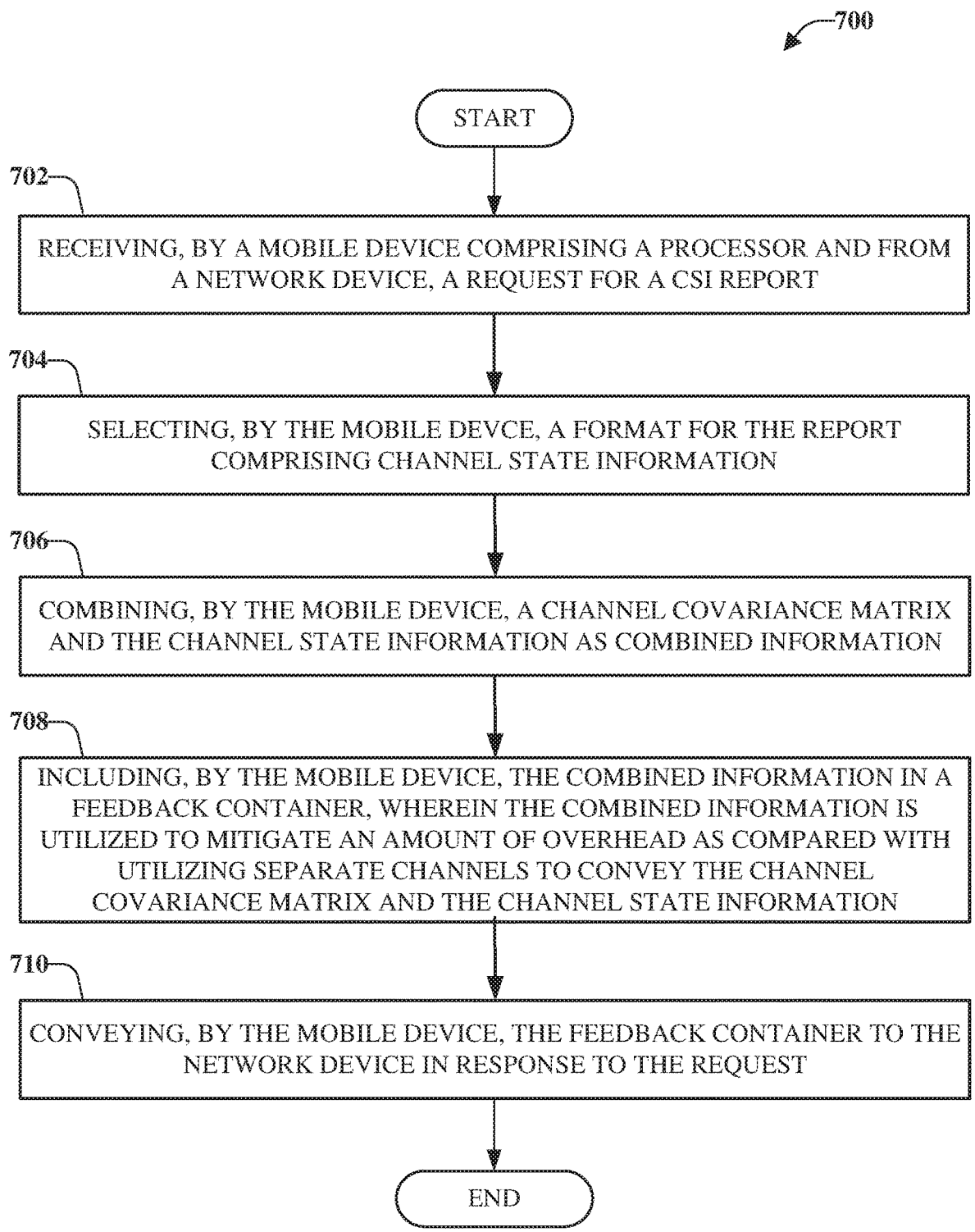
FIG. 7 illustrates an example, non-limiting, method for combining information in a feedback container to facilitate a mitigation of overhead in accordance with one or more embodiments described herein.

FIG. 7 illustrates an example, non-limiting, method 700 for combining information in a feedback container to facilitate a mitigation of overhead in accordance with one or more embodiments described herein. Repetitive description of like elements employed in other embodiments described herein is omitted for sake of brevity. The method 700 can be implemented by a mobile device of a wireless network, the mobile device comprising a processor. Alternatively, or additionally, a machine-readable storage medium can comprise executable instructions that, when executed by a processor, facilitate performance of operations for the method 700.

At 702, a request for a CSI report can be received from a network device (e.g., via the transmitter/receiver 110). Based on the request for the CSI report, at 704, a format for the report comprising CSI can be selected (e.g., via the structure component 306). The format can include, for example, information that should be included in the CSI report (e.g., the report 208). For example, the feedback report can be constructed based on channel statistic and the information to include in the report can be selected at a given time or given feedback instance, without a preconfigured CSI report content.

Further, at 706, a channel covariance matrix and the CSI can be combined as combined information and the combined information can be included in a feedback container, at 708 (e.g., via the container definer component 202). The feedback container can be defined between the network device and the mobile device to carry the channel state information. The contents of the feedback container can change depending on the contents of the feedback report, and different content options can be RRC configurable, or based on a standardized handshake between the network device vendor and the mobile device vendor. The feedback "container" can also carry channel information necessary for over the air calibration.

At 710, the feedback container can be conveyed to the network device in response to the CSI report request. The combined information can be utilized to mitigate an amount of overhead as compared with utilizing separate channels to convey the channel covariance matrix and the channel state information.

Accordingly, the disclosed aspects provide an on-demand compressed channel state information (CSI) feedback report. Such an on-demand selective feedback procedure can solve the large overhead and testability issues that can be caused by explicit feedback from the receiver to the transmitter. According to some implementations, the feedback content inside of the feedback container is not required to be tested by 3GPP, instead, infra-vendor and chip-set vendor should confirm how the feedback information will be used in the inter-device test case.

Figure 8:
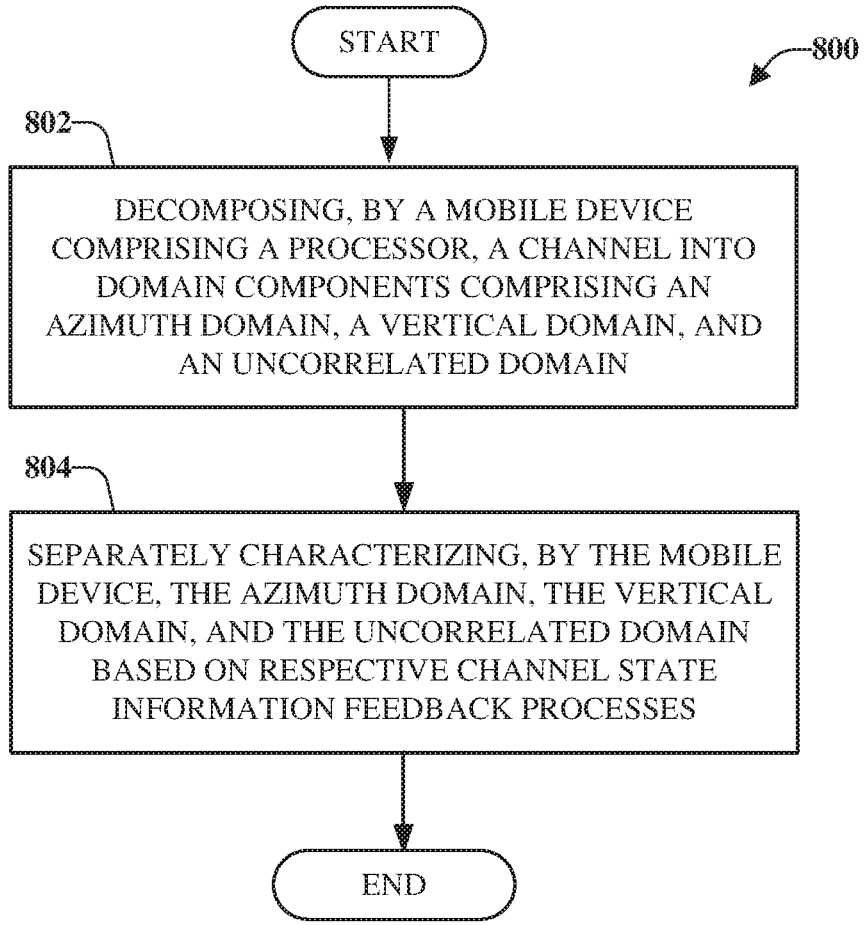
FIG. 8 illustrates an example, non-limiting, method for compression of an on-demand channel state information feedback report in accordance with one or more embodiments described herein.

FIG. 8 illustrates an example, non-limiting, method 800 for compression of an on-demand channel state information feedback report in accordance with one or more embodiments described herein. Repetitive description of like elements employed in other embodiments described herein is omitted for sake of brevity. The method 800 can be implemented by a mobile device of a wireless network, the mobile device comprising a processor. Alternatively, or additionally, a machine-readable storage medium can comprise executable instructions that, when executed by a processor, facilitate performance of operations for the method 800.

At 802, a channel can be decomposed into domain components comprising an azimuth domain, a vertical domain, and an uncorrelated domain (e.g., via the parse component 302). The azimuth domain can track the azimuth direction and the vertical domain can track the vertical dimension. Further the uncorrelated domain can track the possible non-uniformity in the antenna array structure and the cross-polarization.

Further, at 804, separately characterizing the azimuth domain, the vertical domain, and the uncorrelated domain can be performed separately based on respective channel state information feedback processes (e.g., via the parse component 302). For example, the domains can be separately characterized by a CSI feedback process that is optimal for the respective domain. The CSI process optimal for the respective domain can be determined in terms of feedback frequency and granularity, type of precoder used and precoding order, for example.

For example, the azimuth (H) domain can be characterized by a first CSI feedback process, the vertical (V) domain can be characterized by a second CSI feedback process, and the uncorrelated (U) domain can be characterized by a third CSI feedback process. The feedback processes for the three domains can be different feedback processes, or two or more processes can be a same process and/or a similar process.

The three domains (e.g., the azimuth (H) domain, the vertical (V) domain, and the uncorrelated (U) domain) can be determined by the covariance of the channel matrix. Further, the three domains (e.g., the azimuth (H) domain, the vertical (V) domain, and the uncorrelated (U) domain) can relate not only to the antenna structure and its separability but also how it couples with the channel. Only the domain components that are needed for the base station to perform over-the-air calibration are transmitted to the network device.

Described herein are systems, methods, articles of manufacture, and other embodiments or implementations that can facilitate generic feedback to enable reciprocity and over the air calibration for advanced networks. Facilitating generic feedback and over the air calibration for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
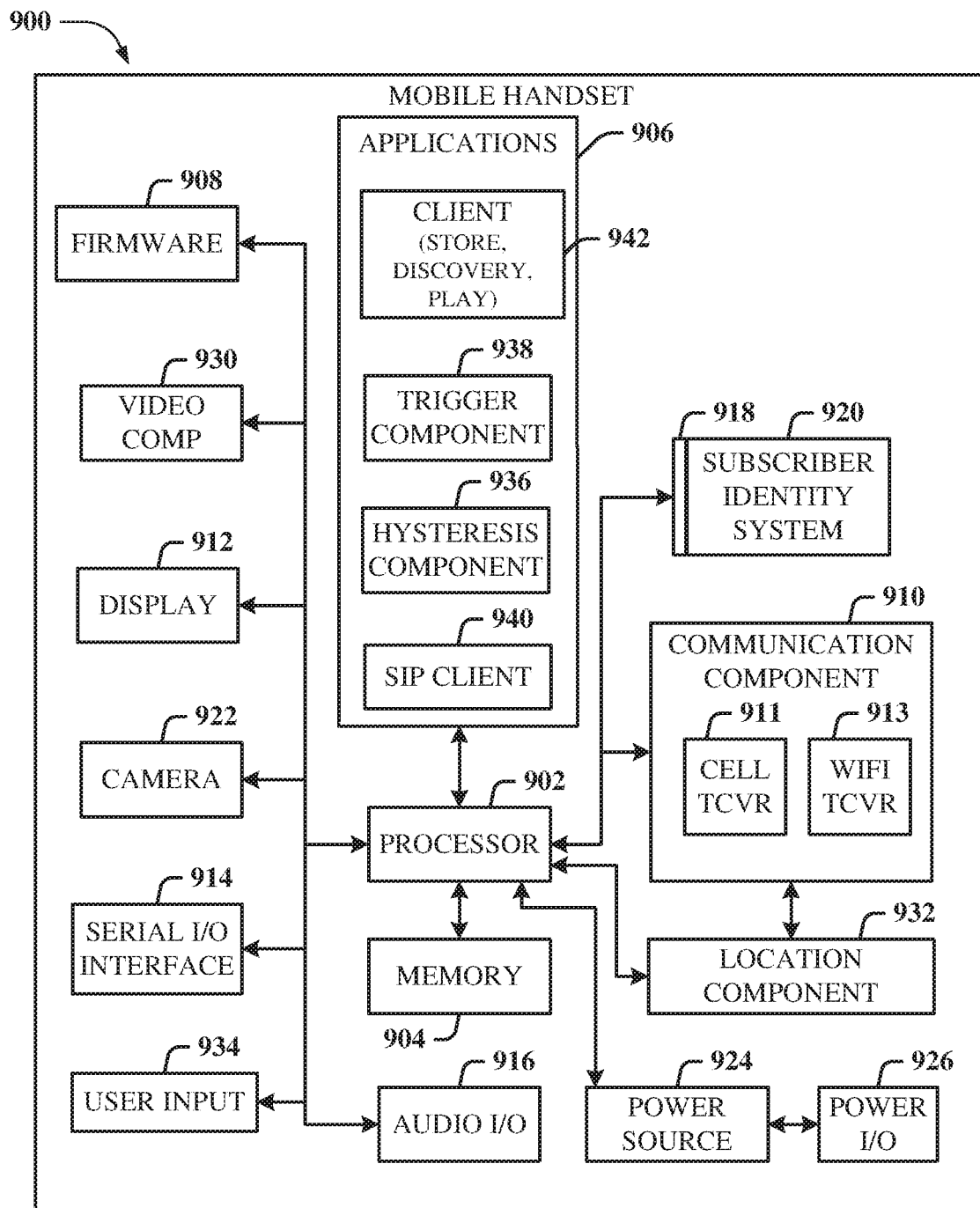
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
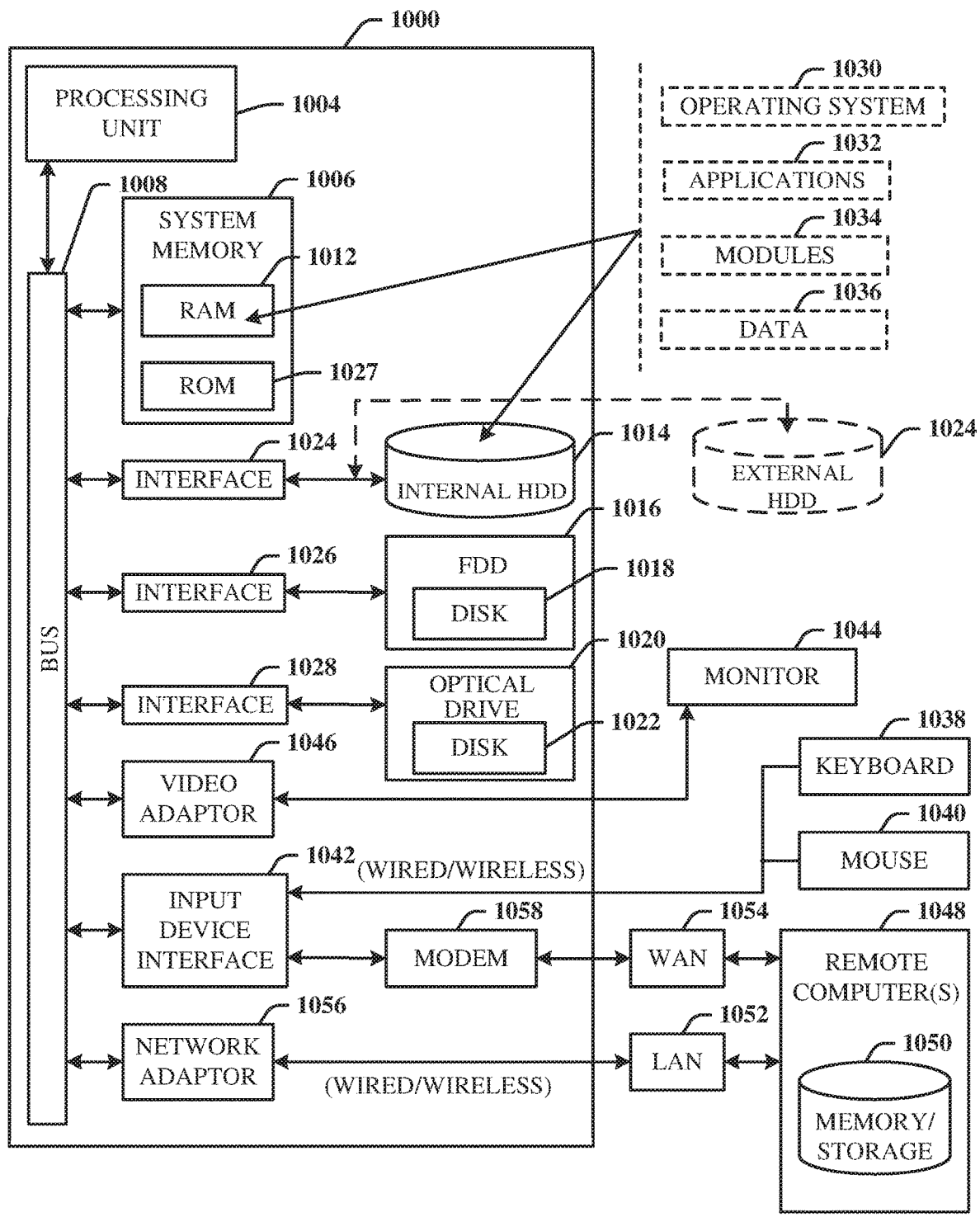
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
generating, by a user equipment comprising a processor, a channel state information feedback report based on an output of facilitating over-the-air calibration at network equipment without an increase of feedback overhead for different groups of antennas; and
transmitting, by the user equipment, the channel state information feedback report to the network equipment based on a request for the channel state information feedback report received from the network equipment.

2. The method of claim 1, wherein the generating comprises selecting channel state information to include in the channel state information feedback report based on conditions at the user equipment when the request is received.

3. The method of claim 1, wherein the generating comprises selecting first information for inclusion in the channel state information feedback report and second information for exclusion from the channel state information feedback report.

4. The method of claim 3, wherein the selecting comprises selecting the first information and the second information in an absence of preconfigured channel state information feedback report content.

5. The method of claim 1, further comprising:
defining, by the user equipment, a feedback container between the network equipment and the user equipment.

6. The method of claim 5, wherein content of the feedback container is dependent on information included in the channel state information feedback report.

7. The method of claim 1, wherein the generating comprises generating the channel state information feedback report as a function of channel statistics of channels.

8. The method of claim 7, further comprising:
decomposing, by the user equipment, the channels into a product of domain components comprising an azimuth domain, a vertical domain, and an uncorrelated domain.

9. The method of claim 8 further comprising:
characterizing, by the user equipment, the azimuth domain, the vertical domain, and the uncorrelated domain separately based on respective channel state information feedback processes.

10. The method of claim 1, wherein the transmitting comprises transmitting the channel state information feedback report via a communications channel configured to operate according to a fifth generation network communication protocol.

11. A system, comprising:
a processor; and
a memory that stores executable instructions that, when executed by the processor, facilitate performance of operations, comprising:
configuring a channel state information report based on a result of facilitating over-the-air calibration at network equipment without an increase of feedback overhead for different groups of antennas; and
sending the channel state information report to the network equipment based on receipt of a request for the channel state information report.

12. The system of claim 11, wherein the operations further comprise:
prior to the configuring, selecting a format for the channel state information report based on the facilitating.

13. The system of claim 11, wherein content of the channel state information report is not preconfigured.

14. The system of claim 11, wherein the operations further comprise:
defining a feedback container to send to the network equipment, wherein the feedback container carries channel state information included in the channel state information report, and wherein content of the feedback container changes based on channel state information included in the channel state information report.

15. The system of claim 11, wherein the operations further comprise:
decomposing a channel into domain components comprising an azimuth domain, a vertical domain, and an uncorrelated domain, wherein the azimuth domain is configured to track an azimuth direction, the vertical domain is configured to track a vertical direction, and the uncorrelated domain is configured to track non-uniformity in an antenna array structure and a cross-polarization.

16. The system of claim 15, wherein the operations further comprise:
separately characterizing the azimuth domain, the vertical domain, and the uncorrelated domain based on respective channel state information feedback processes.

17. The system of claim 11, wherein the operations further comprise:
combining a channel covariance matrix and channel state information as combined information; and
including the combined information in a feedback container, wherein the combined information is utilized to mitigate an amount of overhead as compared with conveying the channel covariance matrix and the channel state information utilizing separate channels.

18. A non-transitory machine-readable medium, comprising executable instructions that, when executed by a processor, facilitate performance of operations, comprising:
generating a feedback report with selected channel state information that is selected based on facilitating over-the-air calibration at network equipment without an increase in feedback overhead for different groups of antennas as compared to utilizing separate channels to convey the selected channel state information; and
transmitting the feedback report to the network equipment based on a request for the feedback report received from the network equipment.

19. The non-transitory machine-readable medium of claim 18, wherein the operations further comprise, prior to the generating, selecting channel state information for including in the feedback report based on conditions at a time when the request was received.

20. The non-transitory machine-readable medium of claim 18, wherein the operations further comprise:
defining a feedback container based on content of the feedback report, wherein the feedback container carries channel state information; and
conveying a definition of the feedback container to the network equipment.

* * * * *